(12) United States Patent
Srinivasan et al.

(10) Patent No.: US 11,126,438 B2
(45) Date of Patent: Sep. 21, 2021

(54) SYSTEM, APPARATUS AND METHOD FOR A HYBRID RESERVATION STATION FOR A PROCESSOR

(71) Applicant: Intel Corporation, Santa Clara, CA (US)

(72) Inventors: Srikanth Srinivasan, Portland, OR (US); Thomas Mullins, Santa Clara, CA (US); Ammon Christiansen, Hillsboro, OR (US); James Hadley, Portland, OR (US); Robert S. Chappell, Portland, OR (US); Sean Mirkes, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 16/452,955

(22) Filed: Jun. 26, 2019

(65) Prior Publication Data
US 2020/0409710 A1 Dec. 31, 2020

(51) Int. Cl.
*G06F 9/22* (2006.01)
*G06F 9/38* (2018.01)
*G06F 9/48* (2006.01)

(52) U.S. Cl.
CPC ............ *G06F 9/384* (2013.01); *G06F 9/3802* (2013.01); *G06F 9/382* (2013.01); *G06F 9/3818* (2013.01); *G06F 9/4881* (2013.01)

(58) Field of Classification Search
CPC ........ G06F 9/30032; G06F 9/22; G06F 9/384; G06F 9/3802; G06F 9/3818; G06F 9/382; G06F 9/4881
See application file for complete search history.

(56) References Cited

U.S. PATENT DOCUMENTS

| 5,778,245 | A | * | 7/1998 | Papworth | ............... | G06F 9/3836 |
| | | | | | | 712/215 |
| 5,951,670 | A | * | 9/1999 | Glew | .................. | G06F 9/30098 |
| | | | | | | 712/200 |
| 6,163,839 | A | * | 12/2000 | Janik | ..................... | G06F 9/3836 |
| | | | | | | 712/218 |

(Continued)

FOREIGN PATENT DOCUMENTS

| EP | 3 416 049 | 12/2018 |
| WO | WO 2006039201 | 4/2006 |

OTHER PUBLICATIONS

Enric Morancho, et al., "Recovery Mechanism for Latency Misprediction," 2001, 24 pages.

(Continued)

*Primary Examiner* — Cheng Yuan Tseng
(74) *Attorney, Agent, or Firm* — Trop, Pruner & Hu, P.C.

(57) ABSTRACT

In one embodiment, a reservation station of a processor includes: a plurality of first lanes having a plurality of entries to store information for instructions having in-order dependencies; a variable latency tracking table including a second plurality of entries to store information for instructions having a variable latency; and a scheduler circuit to access a head entry of the plurality of first lanes to schedule, for execution on at least one execution unit, at least one instruction from the head entry of at least one of the plurality of first lanes. Other embodiments are described and claimed.

17 Claims, 13 Drawing Sheets

(56) References Cited

U.S. PATENT DOCUMENTS

2015/0277925 A1  10/2015  Sleiman et al.

OTHER PUBLICATIONS

Subbarao Palacharla, et al., "Complexity-Effective Superscalar Processors," 1997, 13 pages.
Andreas Sembrant, et al., "Long Term Parking (LTP): Criticality-aware Resource Allocation in OOO Procedures," Nov. 5, 2015, 14 pages.
Srikanth T. Srinivasan, et al., "Continual Flow Pipelines," Oct. 9-13, 2004, 13 pages.
Enric Morancho, et al., "On Reducing Energy-Consumption by Late-Inserting Instructions into the Issue Queue," ISLPED'07, Aug. 27-29, 2007, 4 pages.
U.S. Appl. No. 16/364,704, filed Mar. 26, 2019, entitled, "System, Apparatus And Method For Symbolic Store Address Generation For Data-Parallel Processor," by Jeffrey J. Cook.
U.S. Appl. No. 16/147,696, filed Sep. 29, 2018, entitled "Apparatus and Method for Adaptable and Efficient Lane-Wise Tensor Processing," by Jonathan Pearce, et al.
U.S. Appl. No. 16/220,528, filed Dec. 14, 2018, entitled "Appartus and Method for a High Throughput Parallel Co-Processor and Interconnect With Low Offload Latency," by Jonathan Pearce, et al.
U.S. Appl. No. 16/147,692, filed Sep. 29, 2018, entitled "Architecture and Method for Data Parallel Single Program Multiple Data (SPMD) Execution," by Jonathan Pearce, et al.
European Patent Office, European Search Report dated Nov. 18, 2020 in European patent application No. 20164130.5, 6 pages total.

\* cited by examiner

SYSTEM, APPARATUS AND METHOD FOR A HYBRID RESERVATION STATION FOR A PROCESSOR

BACKGROUND

Modern processors include both in-order and out-of-order processors. In-order processors are very power efficient but suffer from low instruction level parallelism and thus low execution throughput. Out-of-order (OOO) architectures improve execution throughput by allowing independent instructions to execute out of order. OOO architectures however are more power hungry due to complexity of scheduling, among other tasks.

DETAILED DESCRIPTION

Figure 1A:
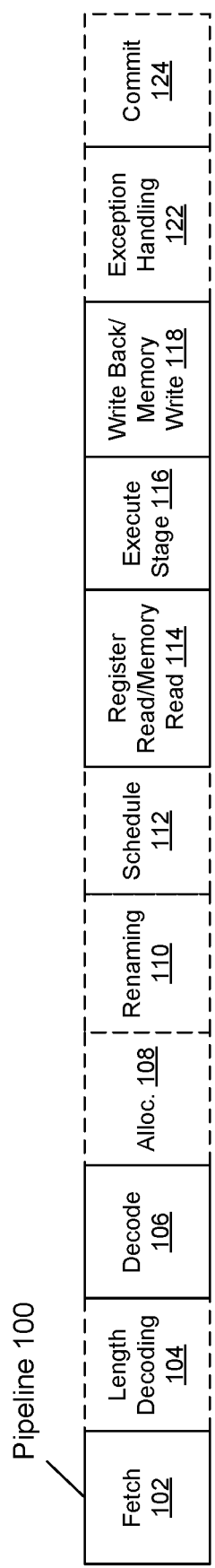
FIG. 1A is a block diagram illustrating both an exemplary in-order pipeline and an exemplary register renaming, out-of-order issue/execution pipeline according to embodiments of the invention.

In various embodiments, a processor includes a reservation station formed of hybrid structures to enable scheduling of instructions both in-order and out-of-order. Understand that as used herein, a "reservation station" is a collection of hardware structures in a processor that is used to maintain information about decoded instructions and schedule such instructions, when ready, to one of multiple functional units of the processor. With embodiments, scheduling efficiency may be increased while reducing power consumption. In an embodiment, a hybrid reservation station in accordance with an embodiment may include a plurality of in-order queues, referred to herein as lanes. Each such lane may include a plurality of entries each to store information associated with an instruction (which at this point in the processor pipeline may be in the form of a decoded micro-instruction (uop)) and metadata, including lane identification information for one or more source operands (also referred to herein as source registers) of an instruction. Such consumer instruction may be dependent on one or more producer instructions that generate results to a destination operand (also referred to herein as destination register) that corresponds to a source operand for the consumer instruction.

In embodiments the hybrid reservation station architecture may further include one or more out-of-order structures. More specifically, in an embodiment a variable latency tracking table (VLTT) is provided within the reservation station to store information associated with instructions having variable execution latency, such as load instructions or division instructions. In addition, another out-of-order structure, referred to herein as a sink lane, may be provided to store information associated with instructions that do not have destination registers, such as stores to memory and other such instructions.

By providing hybrid structures within a reservation station, allocation operations to allocate instructions into the hybrid reservation station may be performed more efficiently. This is so, as a reduced number of structures may be considered in making an allocation decision, allowing greater efficiency and reduced power consumption. In addition with a hybrid reservation station as herein, scheduling operations to schedule instructions deemed ready to execute to a given functional unit also may occur with greater efficiency. This is so, as a fewer number of instructions may be considered in making a scheduling decision, again reducing power consumption and increasing efficiency.

In various embodiments, a hybrid reservation station may achieve significantly lower power consumption as compared to a conventional reservation station for a similar performance level. In embodiments, an allocation circuit may be configured to steer dependent instructions to a producer instruction's lane. In addition this steering determination may include a readiness heuristic at allocation to enable steering based on non-ready sources and if all sources are ready, to steer the instruction towards a new/empty lane. With this arrangement, only the top entry of lanes participate in scheduling decisions, reducing power consumption and complexity, as compared to a conventional reservation station in which all entries are considered. Wakeup within a lane is implicit, in that when a uop reaches the head of a lane, in-lane producers would already have dispatched. If a uop has cross-lane or load dependencies, point-to-point checks may be performed, with a wakeup-based solution. Understand that a wakeup of an instruction may be implemented by setting a ready indicator of an entry of a lane for the instruction. Using in-order lanes in accordance with an embodiment, equal performance may be achieved as compared to a complex, timing-critical, power-hungry out-of-order reservation station.

Figure 1B:
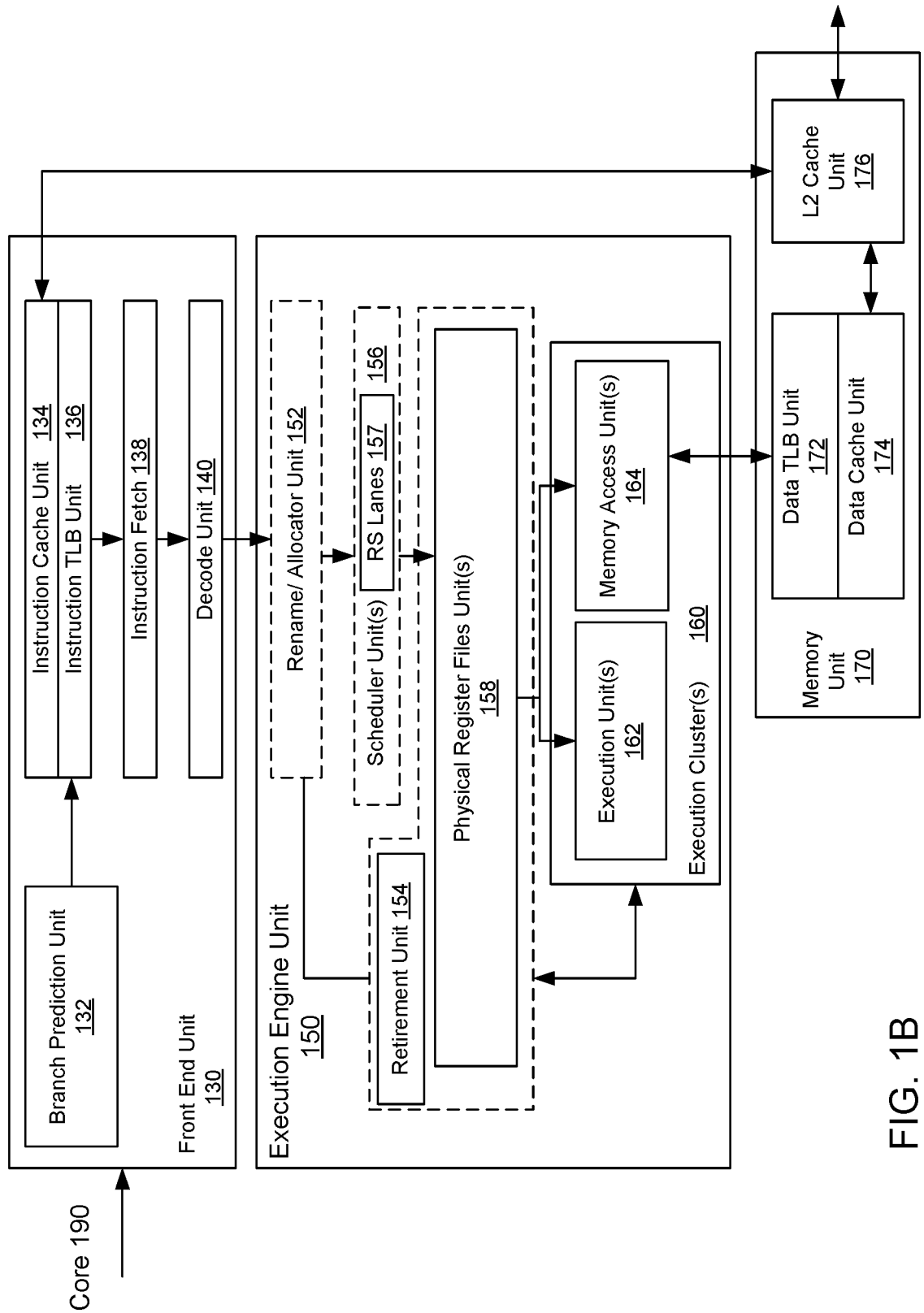
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. In accordance with embodiments herein, scheduler unit(s) 156 may include reservation station circuitry including reservation station (RS) lanes 157. As described briefly above and further herein, RS lanes 157 may be implemented as a hybrid reservation station including a plurality of in-order buffers or lanes and one or more out-of-order queues to improve efficiency of scheduling. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2B:
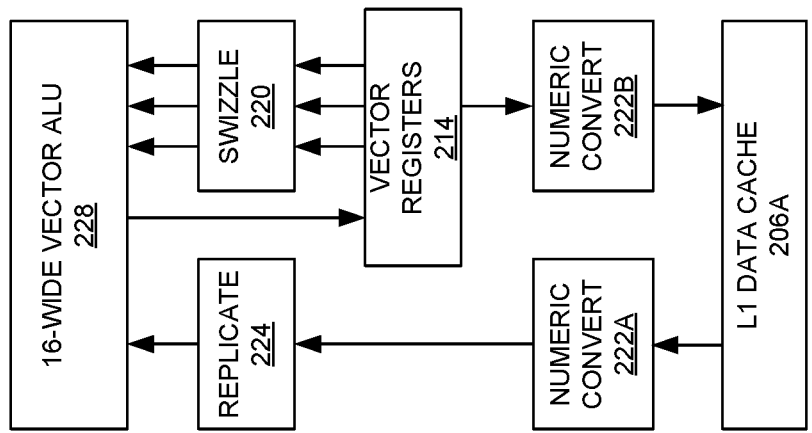
FIGS. 2A-B illustrate a block diagram of a more specific exemplary in-order core architecture in accordance with an embodiment of the present invention.
Figure 2A:
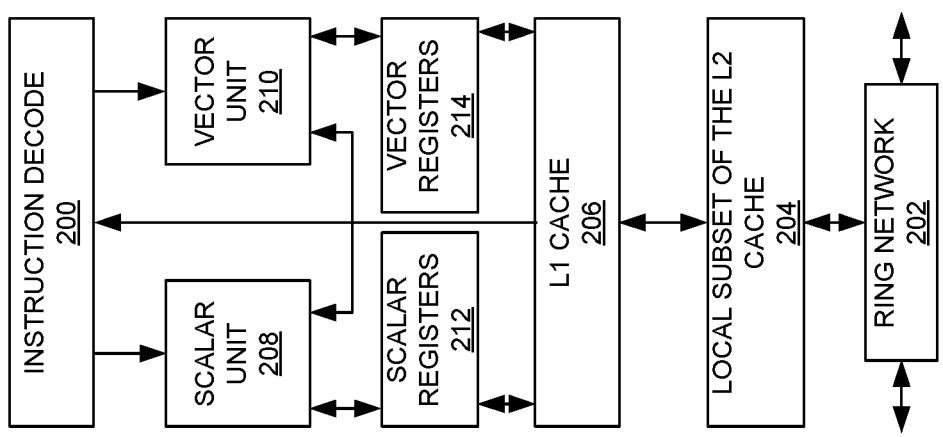

FIGS. 2A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 2A is a block diagram of a single processor core, along with its connection to the on-die interconnect network 202 and with its local subset of the Level 2 (L2) cache 204, according to embodiments of the invention. In one embodiment, an instruction decoder 200 supports the x86 instruction set with a packed data instruction set extension. An L1 cache 206 allows low-latency accesses to cache memory into the scalar and vector units. While in one embodiment (to simplify the design), a scalar unit 208 and a vector unit 210 use separate register sets (respectively, scalar registers 212 and vector registers 214) and data transferred between them is written to memory and then read back in from a level 1 (L1) cache 206, alternative embodiments of the invention may use a different approach (e.g., use a single register set or include a communication path that allow data to be transferred between the two register files without being written and read back).

The local subset of the L2 cache 204 is part of a global L2 cache that is divided into separate local subsets, one per processor core. Each processor core has a direct access path to its own local subset of the L2 cache 204. Data read by a processor core is stored in its L2 cache subset 204 and can be accessed quickly, in parallel with other processor cores accessing their own local L2 cache subsets. Data written by a processor core is stored in its own L2 cache subset 204 and is flushed from other subsets, if necessary. The ring network ensures coherency for shared data. The ring network is bi-directional to allow agents such as processor cores, L2 caches and other logic blocks to communicate with each other within the chip. Each ring datapath is 1024-bits wide per direction in some embodiments.

FIG. 2B is an expanded view of part of the processor core in FIG. 2A according to embodiments of the invention. FIG. 2B includes an L1 data cache 206A part of the L1 cache 204, as well as more detail regarding the vector unit 210 and the vector registers 214. Specifically, the vector unit 210 is a 6-wide vector processing unit (VPU) (see the 16-wide ALU 228), which executes one or more of integer, single-precision float, and double-precision float instructions. The VPU supports swizzling the register inputs with swizzle unit 220, numeric conversion with numeric convert units 222A-B, and replication with replication unit 224 on the memory input.

Figure 3:
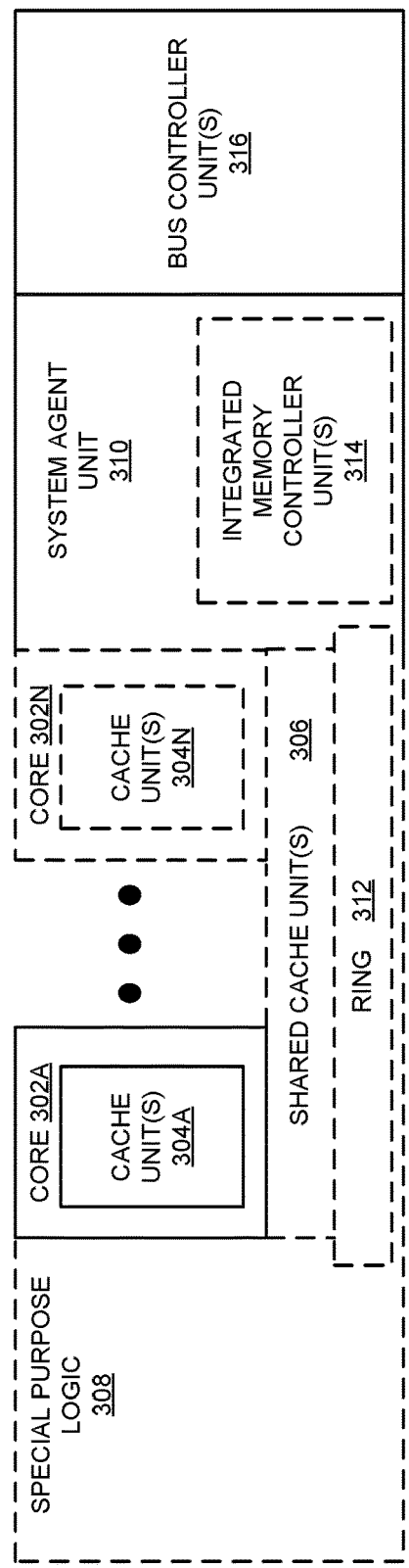
FIG. 3 is a block diagram of a processor that may have more than one core, may have an integrated memory controller, and may have integrated graphics according to embodiments of the invention.

FIG. 3 is a block diagram of a processor 300 that may have more than one core, may have an integrated memory controller, and may have integrated graphics according to embodiments of the invention. The solid lined boxes in FIG. 3 illustrate a processor 300 with a single core 302A, a system agent 310, a set of one or more bus controller units 316, while the optional addition of the dashed lined boxes illustrates an alternative processor 600 with multiple cores 302A-N, a set of one or more integrated memory controller unit(s) 314 in the system agent unit 310, and special purpose logic 308.

Thus, different implementations of the processor 300 may include: 1) a CPU with the special purpose logic 308 being integrated graphics and/or scientific (throughput) logic (which may include one or more cores), and the cores 302A-N being one or more general purpose cores (e.g., general purpose in-order cores, general purpose out-of-order cores, a combination of the two); 2) a coprocessor with the cores 302A-N being a large number of special purpose cores intended primarily for graphics and/or scientific (throughput); and 3) a coprocessor with the cores 302A-N being a large number of general purpose in-order cores. Thus, the processor 300 may be a general purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 300 may be a part of and/or may be implemented on one or more substrates using any of a number of process technologies, such as, for example, BiCMOS, CMOS, or NMOS.

The memory hierarchy includes one or more levels of cache within the cores 304A-N, a set or one or more shared cache units 306, and external memory (not shown) coupled to the set of integrated memory controller units 314. The set of shared cache units 306 may include one or more mid-level caches, such as level 2 (L2), level 3 (L3), level 4 (L4), or other levels of cache, a last level cache (LLC), and/or combinations thereof. While in one embodiment a ring based interconnect unit 312 interconnects the special purpose logic 308, the set of shared cache units 306, and the system agent unit 310/integrated memory controller unit(s) 314, alternative embodiments may use any number of well-known techniques for interconnecting such units. In one embodiment, coherency is maintained between one or more cache units 306 and cores 302-A-N.

In some embodiments, one or more of the cores 302A-N are capable of multithreading. The system agent 310 includes those components coordinating and operating cores 302A-N. The system agent unit 310 may include for example a power control unit (PCU) and a display unit. The PCU may be or include logic and components needed for regulating the power state of the cores 302A-N and the special purpose logic 308.

The cores 302A-N may be homogenous or heterogeneous in terms of architecture instruction set; that is, two or more of the cores 302A-N may be capable of execution the same instruction set, while others may be capable of executing only a subset of that instruction set or a different instruction set.

FIGS. 4-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
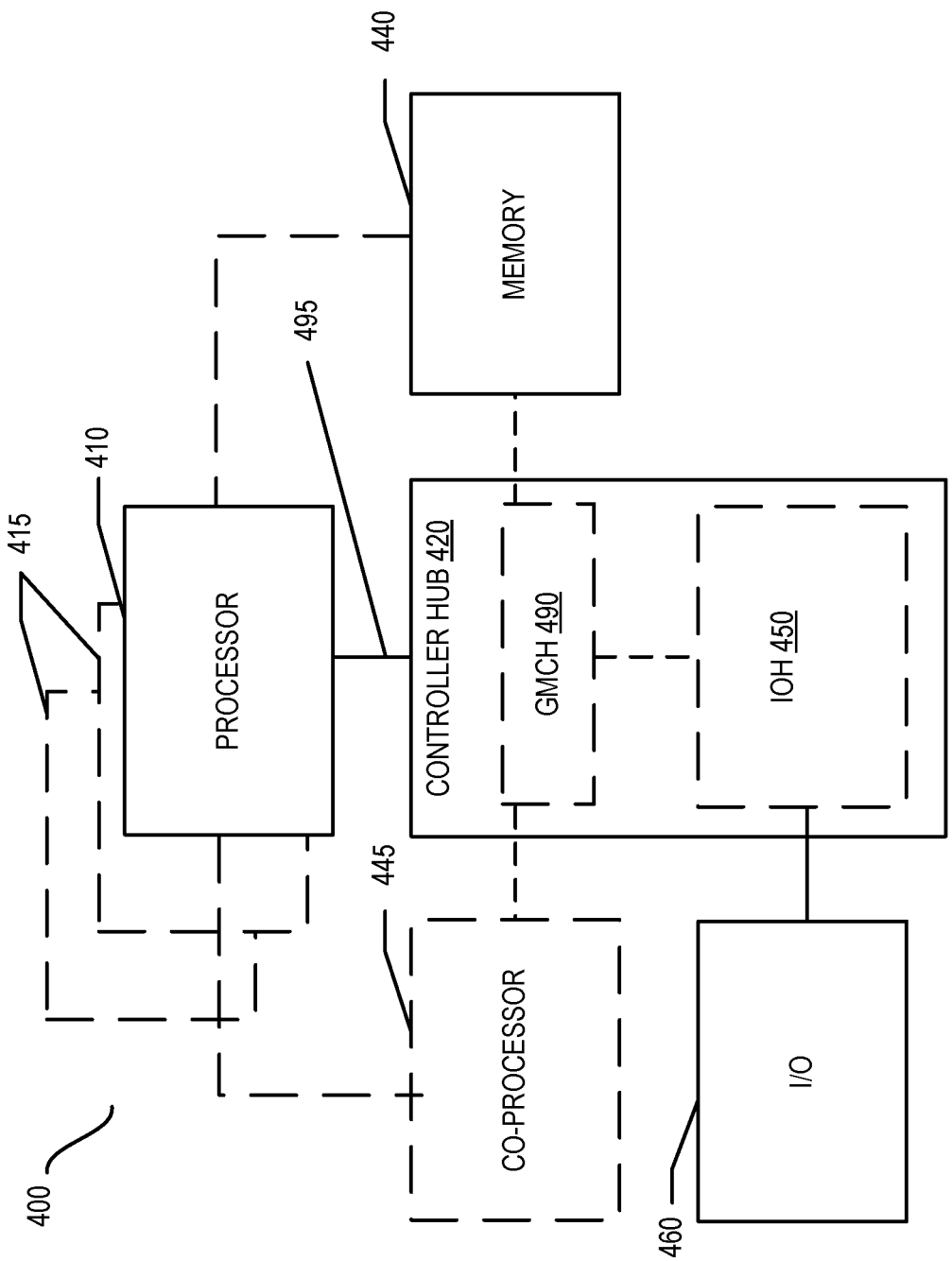
FIG. 4 is a block diagram of a system in accordance with one embodiment of the present invention.

Referring now to FIG. 4, shown is a block diagram of a system 400 in accordance with one embodiment of the present invention. The system 400 may include one or more processors 410, 415, which are coupled to a controller hub 420. In one embodiment, the controller hub 420 includes a graphics memory controller hub (GMCH) 490 and an Input/Output Hub (IOH) 450 (which may be on separate chips); the GMCH 490 includes memory and graphics controllers to which are coupled memory 440 and a coprocessor 445; the IOH 450 is couples input/output (I/O) devices 460 to the GMCH 490. Alternatively, one or both of the memory and graphics controllers are integrated within the processor (as described herein), the memory 440 and the coprocessor 445 are coupled directly to the processor 410, and the controller hub 420 in a single chip with the IOH 450.

The optional nature of additional processors 415 is denoted in FIG. 4 with broken lines. Each processor 410, 415 may include one or more of the processing cores described herein and may be some version of the processor 300.

The memory 440 may be, for example, dynamic random access memory (DRAM), phase change memory (PCM), or a combination of the two. For at least one embodiment, the controller hub 420 communicates with the processor(s) 410, 415 via a multidrop bus, such as a frontside bus (FSB), point-to-point interface, or similar connection 495.

In one embodiment, the coprocessor 445 is a special-purpose processor, such as, for example, a high-throughput MIC processor, a network or communication processor, compression engine, graphics processor, GPGPU, embedded processor, or the like. In one embodiment, controller hub 420 may include an integrated graphics accelerator.

There can be a variety of differences between the physical resources 410, 415 in terms of a spectrum of metrics of merit including architectural, microarchitectural, thermal, power consumption characteristics, and the like.

In one embodiment, the processor 410 executes instructions that control data processing operations of a general type. Embedded within the instructions may be coprocessor instructions. The processor 410 recognizes these coprocessor instructions as being of a type that should be executed by the attached coprocessor 445. Accordingly, the processor 410 issues these coprocessor instructions (or control signals representing coprocessor instructions) on a coprocessor bus or other interconnect, to coprocessor 445. Coprocessor(s) 445 accept and execute the received coprocessor instructions.

Figure 5:
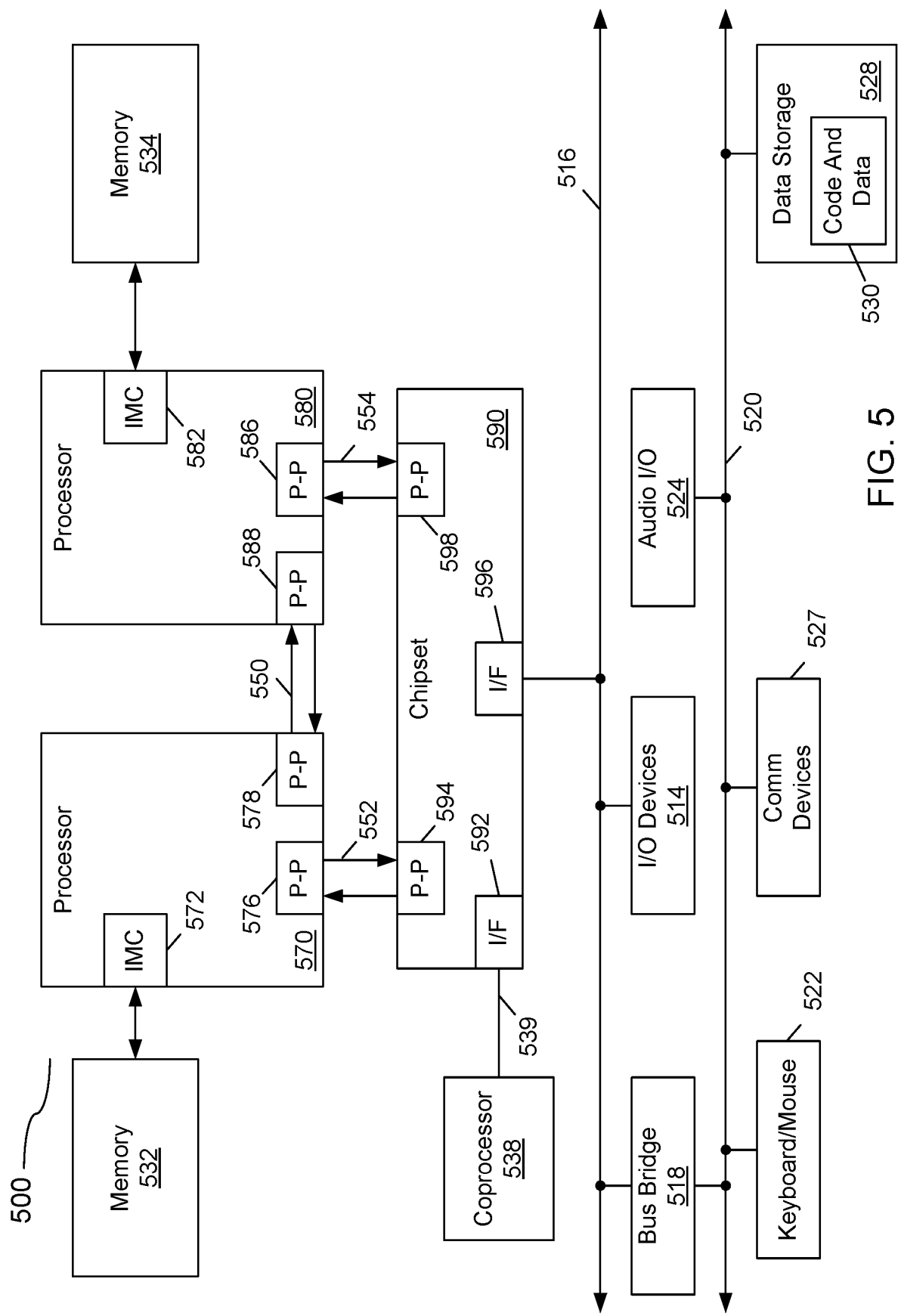
FIG. 5 is a block diagram of a first more specific exemplary system in accordance with an embodiment of the present invention.

Referring now to FIG. 5, shown is a block diagram of a first more specific exemplary system 500 in accordance with an embodiment of the present invention. As shown in FIG. 5, multiprocessor system 500 is a point-to-point interconnect system, and includes a first processor 570 and a second processor 580 coupled via a point-to-point interconnect 550. Each of processors 570 and 580 may be some version of the processor 300. In one embodiment of the invention, processors 570 and 580 are respectively processors 410 and 415, while coprocessor 538 is coprocessor 445. In another embodiment, processors 570 and 580 are respectively processor 410 and coprocessor 445.

Processors 570 and 580 are shown including integrated memory controller (IMC) units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may optionally exchange information with the coprocessor 538 via a high performance interface 592. In one embodiment, the coprocessor 538 is a special-purpose processor, such as, for example, a high throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another I/O interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, one or more additional processor(s) 515, such as coprocessors, high-throughput MIC processors, GPGPU's, accelerators (such as, e.g., graphics accelerators or digital signal processing (DSP) units), field programmable gate arrays, or any other processor, are coupled to first bus 516. In one embodiment, second bus 520 may be a low pin count (LPC) bus. Various devices may be coupled to a second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to the second bus 516. Note that other architectures are possible. For example, instead of the point-to-point architecture of FIG. 5, a system may implement a multi-drop bus or other such architecture.

Figure 6:
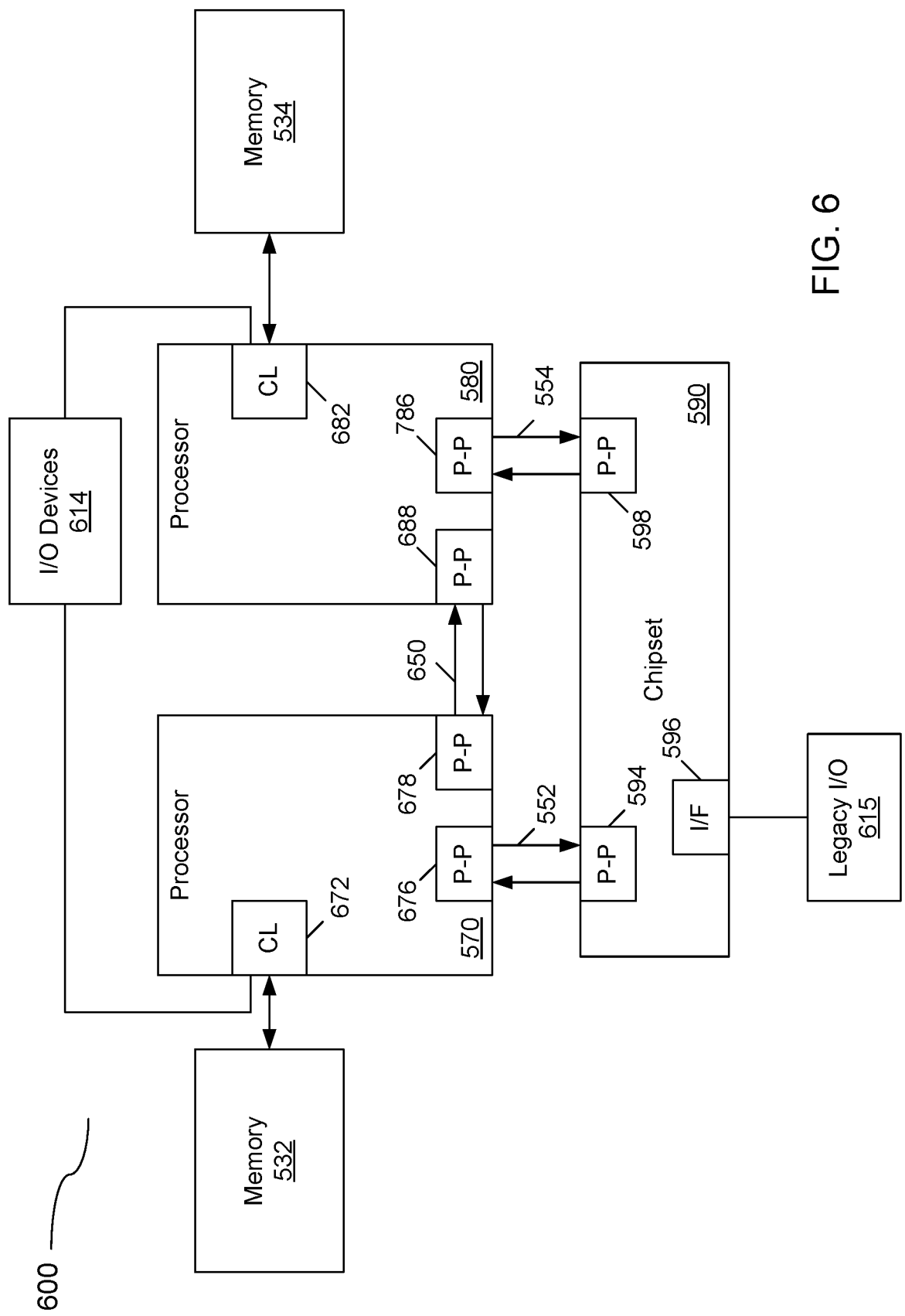
FIG. 6 is a block diagram of a second more specific exemplary system in accordance with an embodiment of the present invention.

Referring now to FIG. 6, shown is a block diagram of a second more specific exemplary system 600 in accordance with an embodiment of the present invention. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 570, 580 may include integrated memory and I/O control logic ("CL") 672 and 682, respectively. Thus, the CL 672, 682 include integrated memory controller units and include I/O control logic. FIG. 6 illustrates that not only are the memories 532, 534 coupled to the CL 572, 582, but also that I/O devices 614 are also coupled to the control logic 572, 582. Legacy I/O devices 615 are coupled to the chipset 590.

Figure 7:
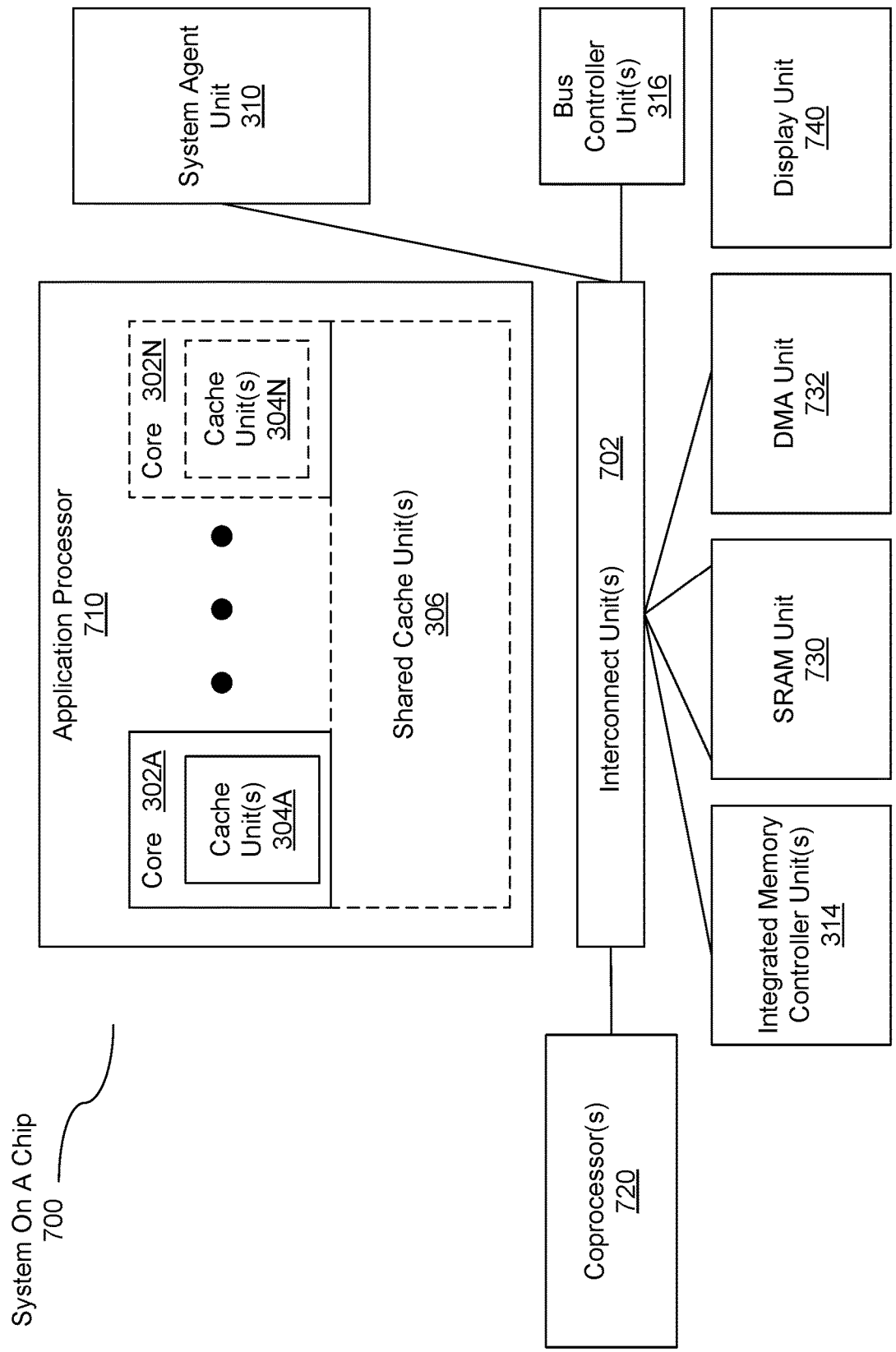
FIG. 7 is a block diagram of a SoC in accordance with an embodiment of the present invention.

Referring now to FIG. 7, shown is a block diagram of a SoC 700 in accordance with an embodiment of the present invention. Similar elements in FIG. 3 bear like reference numerals. Also, dashed lined boxes are optional features on more advanced SoCs. In FIG. 7, an interconnect unit(s) 702 is coupled to: an application processor 710 which includes a set of one or more cores 302A-N, cache units 304A-N, and shared cache unit(s) 306; a system agent unit 310; a bus controller unit(s) 316; an integrated memory controller unit(s) 314; a set or one or more coprocessors 720 which may include integrated graphics logic, an image processor, an audio processor, and a video processor; an static random access memory (SRAM) unit 730; a direct memory access (DMA) unit 732; and a display unit 740 for coupling to one or more external displays. In one embodiment, the coprocessor(s) 720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 530 illustrated in FIG. 5, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include nontransitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 8:
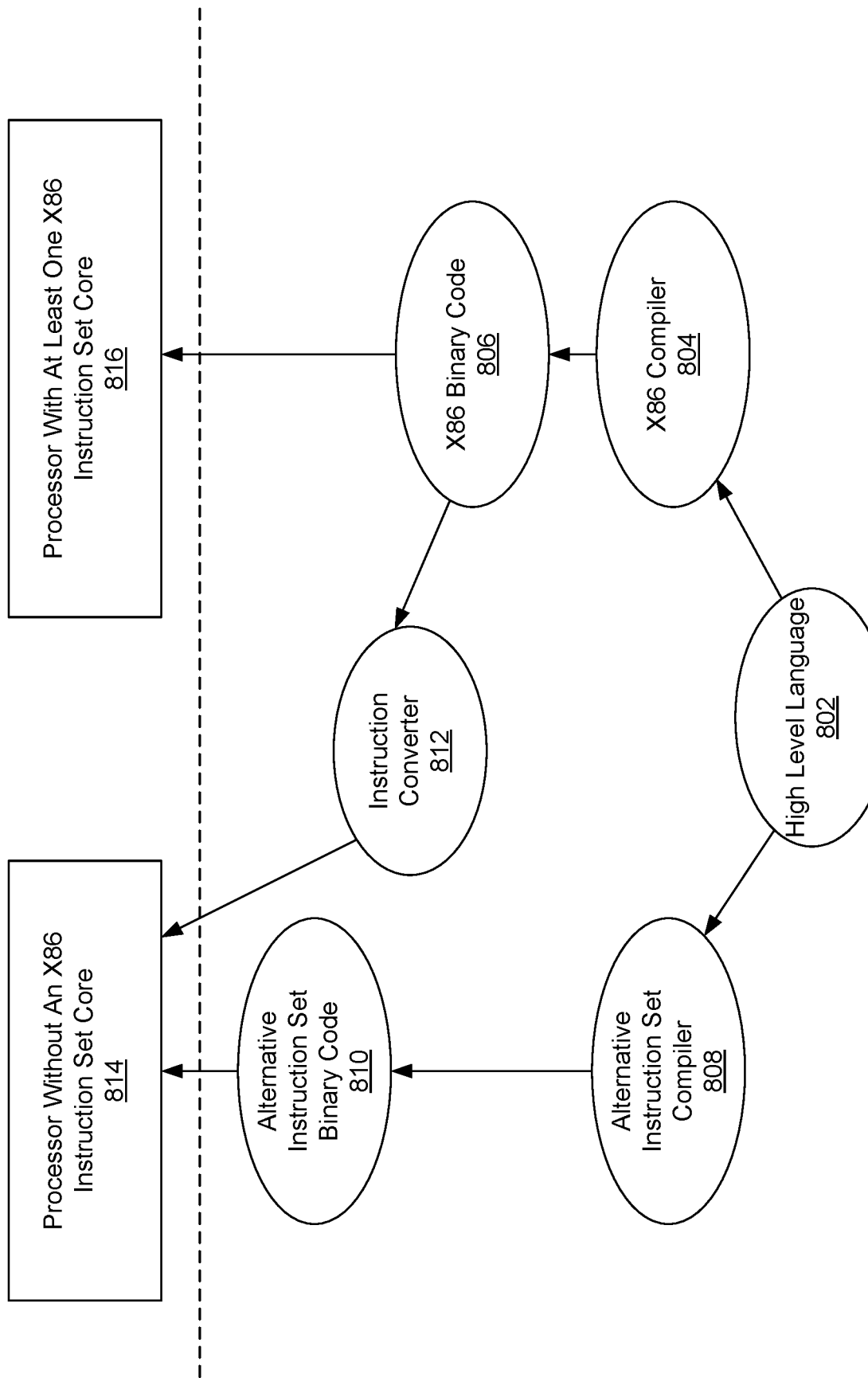
FIG. 8 is a block diagram contrasting the use of a software instruction converter to convert binary instructions in a source instruction set to binary instructions in a target instruction set according to embodiments of the invention.

FIG. 8 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 8 shows a program in a high level language 802 may be compiled using a first compiler 804 to generate a first binary code (e.g., x86) 806 that may be natively executed by a processor with at least one first instruction set core 816. In some embodiments, the processor with at least one first instruction set core 816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel® processor with at least one x86 instruction set core. The first compiler 804 represents a compiler that is operable to generate binary code of the first instruction set 806 (e.g., object code) that can, with or without additional linkage processing, be executed on the processor with at least one first instruction set core 816. Similarly, FIG. 8 shows the program in the high level language 802 may be compiled using an alternative instruction set compiler 808 to generate alternative instruction set binary code 810 that may be natively executed by a processor without at least one first instruction set core 814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 812 is used to convert the first binary code 806 into code that may be natively executed by the processor without an first instruction set core 814. This converted code is not likely to be the same as the alternative instruction set binary code 810 because an instruction converter capable of this is difficult to make; however, the converted code will accomplish the general operation and be made up of instructions from the alternative instruction set. Thus, the instruction converter 812 represents software, firmware, hardware, or a combination thereof that, through emulation, simulation or any other process, allows a processor or other electronic device that does not have a first instruction set processor or core to execute the first binary code 806.

Instruction set architecture (ISA) extensions for accelerating data parallel workloads require explicit vector word lengths encoded in the machine representation. One embodiment of the invention extends an existing ISA (e.g., such as an x86 ISA) with a scalar microthreaded instruction processing architecture. In particular, a data parallel single program multiple data (SPMD) microarchitecture may be used to provide for scalable execution datapath sizes beyond the limitations of existing instructions, achieving greater instruction execution throughput with reduced energy consumption.

Figure 9:
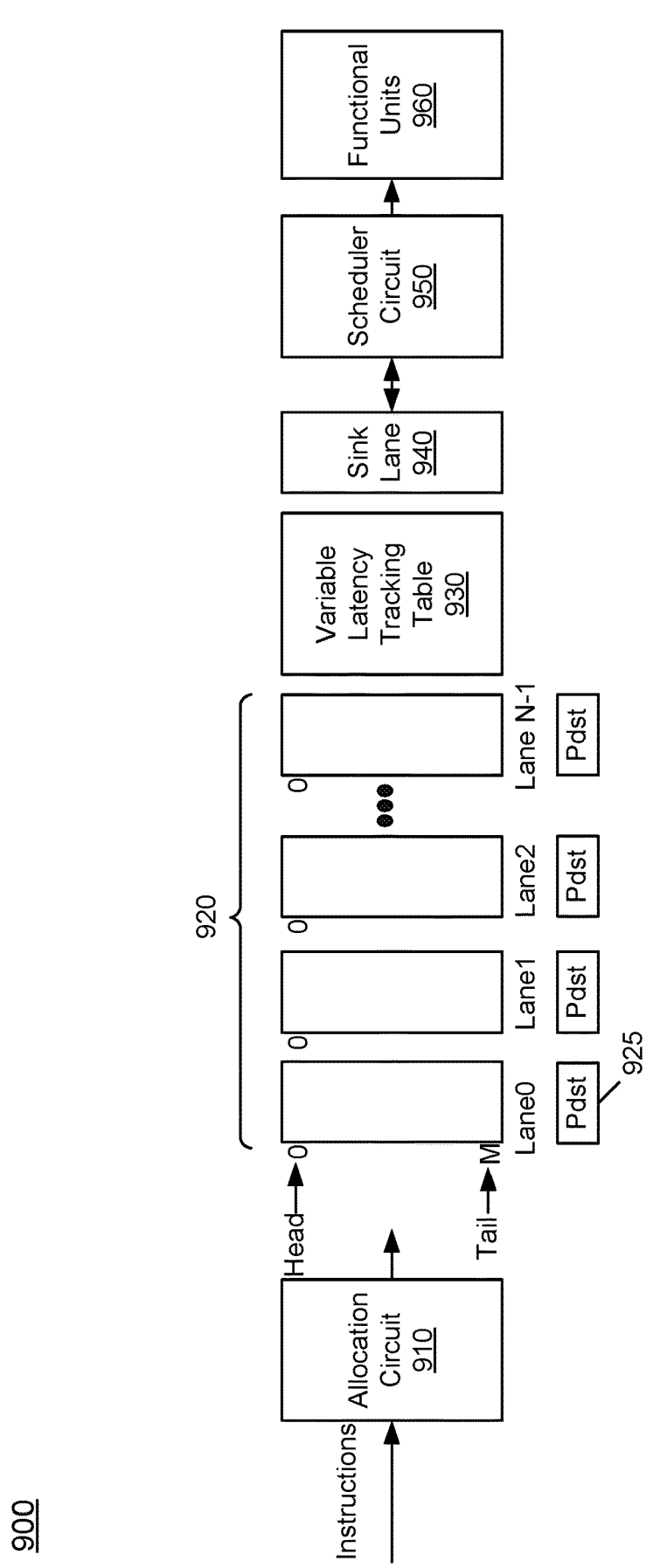
FIG. 9 is a block diagram of a reservation station in accordance with an embodiment of the present invention.

Referring now to FIG. 9, shown is a block diagram of a reservation station in accordance with an embodiment of the present invention. A reservation station 900 may be implemented within many different types of processors, including OOO processors and processors having a mix of in-order and OOO processing circuits. As illustrated, reservation station 900, which may be a primary scheduler circuit of the processor, receives decoded instructions (e.g., in the form of decoded uops), allocates them into structures of reservation station 900, and thereafter schedules such instructions, when their source operands are ready, for execution in one of various functional units of the processor.

As illustrated in FIG. 9, incoming instructions may be received in an allocation circuit 910. In embodiments, allocation circuit 910 may allocate an instruction and associated information into a given one of different storage structures of reservation station 900. More specifically as illustrated, reservation station 900 includes a plurality of in-order queues 920, also referred to herein as lanes. In the embodiment shown, there may be N lanes 920, each of which may be implemented as a first-in first-out (FIFO) buffer, queue or other storage structure to store information for one or more instructions. In an embodiment, there may be N FIFO lanes 920, each having M entries to store M instructions and associated instruction information. Although the scope of the present invention is not limited in this regard, in embodiments N may be between 4 and 64, and M may be between 4 and 16.

As illustrated, each lane 920 includes a plurality of entries, including a head entry following through to a tail entry, where the head entry stores the oldest allocated instruction and the tail entry stores the most recently allocated instruction. In addition, each lane 920 may include or be associated with a corresponding content addressable memory (CAM) structure 925 into which a physical register destination (Pdst) identifier for a tail uop is stored, which may be used in the allocation process as described herein. In an embodiment, each entry in lanes 920 includes instruction information for use in execution (e.g., opcode, physical register source/destination IDs, reorder buffer ID (ROBID)), as well as any other information used for wakeup. The entries also may include a per-source DepOnLoad finite state machine (FSM) (described below) to track loads through an execution pipeline. In addition, entries may have producer lane ID and entry ID for wakeup. Note that these identifiers may be provided per source, including for sources in the same lane and cross-lane sources. Each entry also may include a ready indicator per source, e.g., a ready bit which, when set, identifies the instruction as ready for execution with respect to that source in that the corresponding source has been scheduled. Also, each lane may store a head pointer of every other lane to compare for cross-lane producers. Each lane may further maintain a stall counter at the lane head, which may maintain a history of scheduling. This history may include, in one embodiment, a count of cycles since a last instruction was scheduled from the lane. The history may further include a history of which cycles had an instruction that scheduled. For instance, if there are 3 cycles of bypass before a value can be read from a physical register file, this counter may track whether an instruction scheduled in each of these past 3 cycles. That way, a consumer can determine a number of cycles since the second-to-last instruction or third-to-last instruction scheduled. Such stall information may be used for readiness and bypass calculations as described below.

In addition to in-order queues 920, reservation station 900 further includes a variable latency tracking table (VLTT) 930, which is implemented as an out-of-order structure. In embodiments herein, variable latency tracking table 930 may include a plurality of entries each to store information for a variable latency instruction such as a load instruction, division instruction or so forth. In an embodiment, each entry of variable latency tracking table 930 may include instruction information for a given variable length instruction and a plurality of lane fields each corresponding to one of lanes 920. Each such lane field may store an index value (e.g., an entry ID) corresponding to a first consumer instruction within the corresponding lane that uses a destination of the variable latency instruction of the entry as a source, in order to wake up dependents. In an embodiment VLTT entries may hold the same instruction information as entries in in-order lanes, but for wakeup they only have physical sources and DepOnLoad FSMs.

Still with reference to FIG. 9, reservation station 900 further includes a sink lane 940. In embodiments herein, sink lane 940 may include a plurality of entries each to store instruction information associated with an instruction that does not have a destination operand. In this way, store and branch instructions (e.g.,) may be placed in this lane as these instructions terminate dependence chains. In different embodiments, sink lane 940 may be implemented as an in-order structure or an out-of-order structure.

Allocation circuit 910 may steer a consumer instruction of a register into a lane that stores the producer instruction of that register in its tail entry. In this way, every instruction has a read-after-write (RAW) dependency on the instruction in front of it, and only the instruction at the head is possibly ready. Without this restriction, FIFO ordering of the lanes would lead to delays for instructions behind the head that are ready but cannot schedule.

In embodiments, a register alias table (RAT) (not shown in FIG. 9) stores associations between physical register IDs and logical registers, and which is looked up during an allocation and renaming process. In addition to this mapping information, the RAT includes, in each entry, a lane ID of a producer lane that stores a producer instruction of the physical register ID. Each RAT entry also may include tracking information, namely an index value as to where the producer is stored within the producer lane. For each logical register source of an instruction, the lane ID is read out of the RAT and used to check tail CAMs to find producer entries in producer lanes. Then on allocation, the producer lane/entry ID (e.g., index value) is written into the allocated entry of the selected lane.

As described above, each lane 920 stores, in a CAM entry 925, a physical register destination (Pdst) identifier of its tail entry (namely, the last instruction stored in the lane). After renaming, an instruction has its sources' physical source register (Psrc) identifiers and their producer lane IDs. To choose a lane to allocate into, allocation circuit 910 checks Psrcs of an instruction against the lane tail Pdsts (stored in CAM entries) of the producer lanes storing producers of the sources, to find eligible partially full lanes. If none are found, allocation circuit 910 allocates the instruction to a new lane. Allocation circuit 910 further searches each source's producing lane to find the entry of the producer and stores that entry's index in an index field for the allocated entry. In this way, substantial reduction can be realized in setup power as compared to a matrix scheduler that searches every reservation station entry for producers.

Note that if an instruction is dependent on an entry in VLTT 930, and it is the first instruction in its lane to be dependent on that entry, allocation circuit 910 further causes a write of the index of this allocated entry into a lane field associated with the allocated lane of the VLTT entry for the producer instruction. With this arrangement, the VLTT only tracks the first consumer in each lane, so subsequent instructions do not update the VLTT entry.

Reservation station 900 further includes a scheduler circuit 950 which, in each cycle, may schedule one or more instructions for execution in a given one of functional units 960. Functional units 960 may include arithmetic logic units, load and store units and so forth.

Still with reference to FIG. 9, scheduler circuit 950 may, in each cycle, select one or more instructions present in a head entry of lanes 920 and/or one or more instructions present in variable latency tracking table 930 and sink lane 940 for execution. In embodiments, scheduler circuit 950 takes advantage of RAW dependencies to achieve similar performance to a fully OOO scheduler while making scheduling decisions on a much smaller subset of instructions. Upon scheduling of a given instruction, note that various information stored within the structures in reservation station 900 may be updated to enable identification of additional instructions ready for execution. Understand while shown at this high level in the embodiment of FIG. 9, many variations and alternatives are possible.

In operation, allocation circuit 910 may according to techniques described herein allocate a given instruction into one of in-order queues 920 when an instruction has a RAW dependency (e.g., on an instruction in a given lane). In turn, instructions that may be executed out-of-order, including variable latency instructions and instructions not having destination operands, may be allocated by allocation circuit 910 into one of variable latency tracking table 930 and sink lane 940, respectively.

Figure 10A:
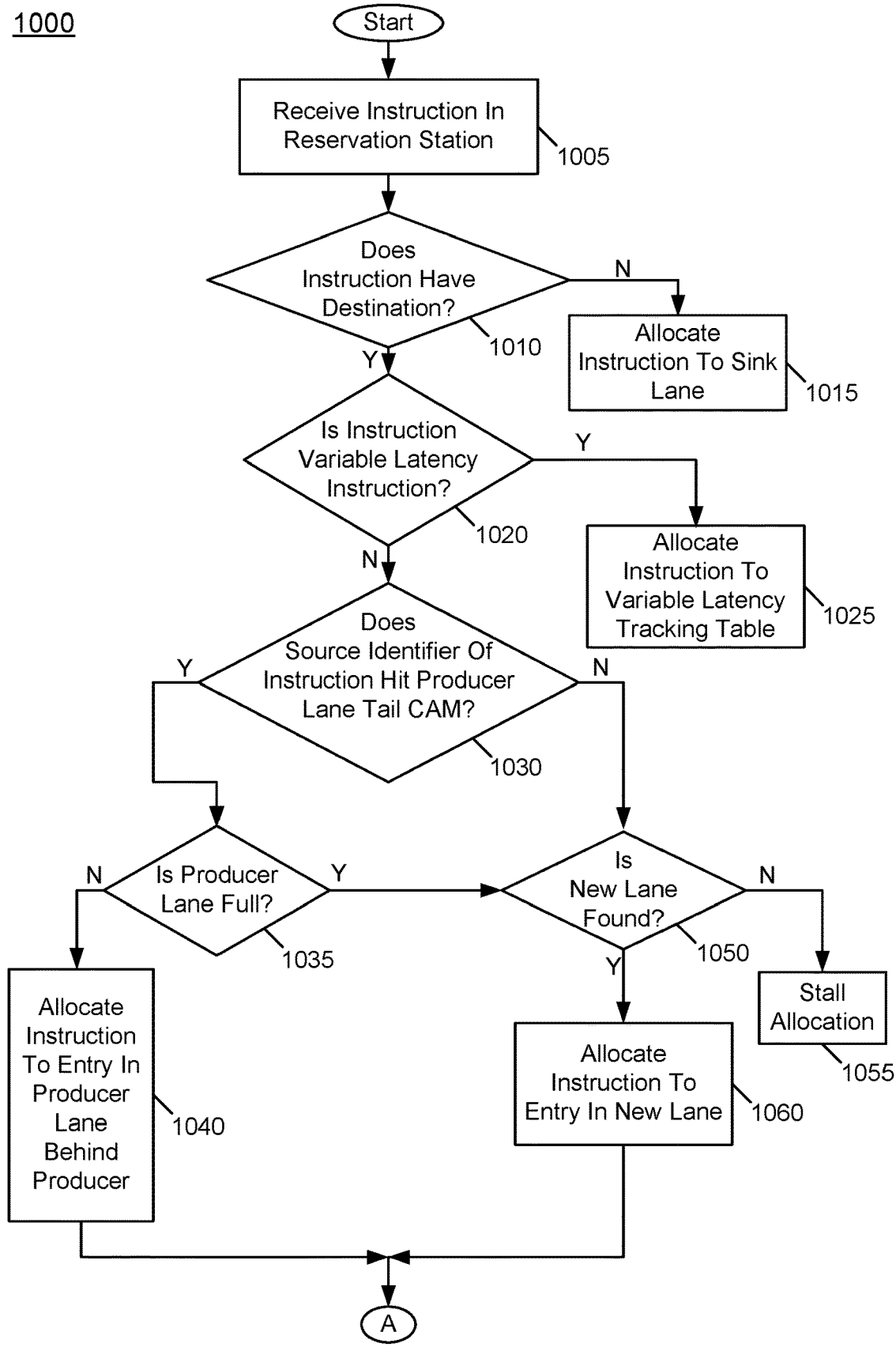
FIGS. 10A and 10B are flow diagrams of a method in accordance with an embodiment of the present invention.
Figure 10B:
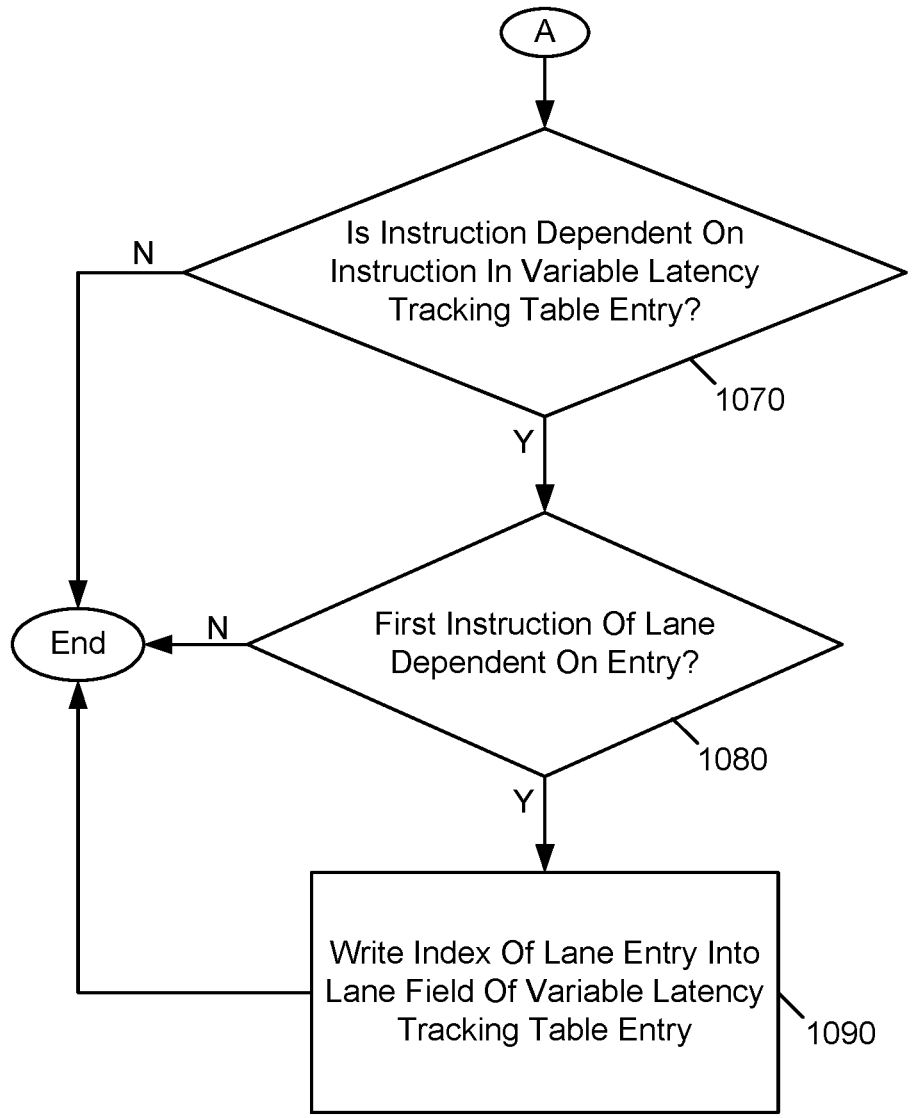

Referring now to FIGS. 10A and 10B, shown are flow diagrams of a method in accordance with an embodiment of the present invention. As shown in FIGS. 10A and 10B, a method 1000 is a method for allocating an instruction into a given structure of a hybrid reservation station in accordance with an embodiment. As such, method 1000 may be performed by hardware circuitry, firmware, microcode and/or combinations thereof. In a particular embodiment, method 1000 may be performed by a control circuit of a reservation station, such as an allocation circuit, which may execute firmware and/or microcode to perform the method. Note that as embodiments may be performed in processor internal hardware structures, the techniques herein may remain transparent to user-level code, which does not comprehend the structures of such embodiments.

As illustrated, method 1000 begins by receiving an instruction in the reservation station (block 1005). For example, a uop may be received in an allocation circuit of the reservation station. This uop in decoded form may further identify sources and destination for the instruction. Next it is determined whether the instruction has a destination operand (diamond 1010). If not, control passes to block 1015 where the instruction may be allocated to a sink lane. Understand that this sink lane is an out-of-order structure which may include a plurality of entries each to store information associated with an instruction that may be executed out-of-order. Still with reference to FIG. 10A, if the incoming instruction does in fact have a destination, control passes to diamond 1020 to determine whether the instruction is a variable latency instruction, such as a load instruction. If so, control passes to block 1025 where the instruction may be allocated into an entry of a variable latency tracking table.

Instead if the instruction is a fixed latency instruction such as various arithmetic instructions, control passes to diamond 1030 to determine whether a source identifier of the instruction hits in a CAM of a producer lane. For each logical register source of an instruction, the lane ID read out of the RAT is used to check tail CAMs to find producer entries in producer lanes. Thus the operation at diamond 1030 may determine whether a source identifier of the incoming instruction matches the physical register identifier for the destination register of the tail entry of the producer lane. If so, control passes to diamond 1035 to determine whether the producer lane is full. If not, control passes to block 1040 where the instruction may be allocated to an entry in this producer lane. More specifically, this instruction may be allocated into the entry immediately following its producer instruction such that in-order scheduling is implicit. This allocation may store various information associated with the incoming instruction into the identified entry of this lane. Such information may include instruction information, and the producer lane/entry ID. In an embodiment, in-lane sources are immediately marked "ready." For in-lane sources, a distance from the in-lane producer entry may be used for bypass calculation.

If multiple sources have CAM hits, after filtering out those that met the readiness heuristic and those with full producer lanes, any strategy can be used to identify an appropriate lane for storing an incoming instruction. For example, the lane with the fewest instructions may be selected, or in other cases the first source in the instruction or the source that allocated most recently may be used to select a lane.

Still with reference to FIG. 10A, instead if there is no CAM hit or the producer lane is full, control passes to diamond 1050 where it is determined whether a new lane is found. Such lane may be found where there is an available lane that does not store any valid instructions. If such new lane is found, control passes to block 1060 where the instruction may be allocated to an entry in this new lane. Otherwise, allocation of incoming instructions into the reservation station may be stalled (block 1055), e.g., by sending a stall signal back to an instruction queue feeding an allocation/rename pipeline. Reads from the instruction queue are stalled in this case, though the queue can continue filling with instructions.

Method 1000 continues on FIG. 10B. More specifically here, after allocation of an instruction into an entry, it further may be determined whether the instruction is dependent on an instruction in an entry of the variable length tracking table (diamond 1070). If not, allocation is completed. Otherwise if it is determined that the instruction is dependent upon a variable latency instruction, control passes to diamond 1080 to determine whether this is the first instruction of the lane that is dependent upon this entry of the variable latency tracking table. If so, an index of the lane entry into which the incoming instruction is stored may be written into a lane field of the entry of the variable latency tracking table associated with this allocated lane (block 1090). As such, this lane index may be used when the producer variable latency instruction is scheduled to identify the dependent instruction as being ready for execution. Understand while shown at this high level in the embodiment of FIGS. 10A and 10B, many variations and alternatives are possible.

Instruction wakeup from in-lane producers is implicit due to the ordering of the lane. Wakeup from cross-lane producers is checked when the instruction is at a predetermined entry of the lane. In an embodiment, this predetermined entry is the head-1 position in the lane (HOL−1). Cross-lane checking may be performed by comparing the stored producer index with the head pointer of the producer's lane. If the head pointer has moved past the producer instruction, then the producer instruction has scheduled. An instruction moves to the head position in the lane only when its sources are ready. Note that ready bits of the entry are used to help determine when an instruction moves to the head of lane. In an embodiment, the actual "head of lane" that scheduling logic considers is staged separately from the entry to which the head pointer points, so that the schedule loop does not have to read ready information out of the lane.

When an instruction schedules, the lane broadcasts the advancement of its head pointer to the head-1 entry of all other lanes. If the head pointer wraps, the lane broadcasts this information to all entries, not just the head-1 entry, so that any sources dependent on that lane may be marked as ready.

When a VLTT instruction schedules, it wakes up only the first consumer in each lane, by setting the ready bit and later consumers know to assume that their VLTT source is ready when they reach the head of the lane. As discussed above, only the head entry of each lane participates in scheduling. In one embodiment, an age-ordering matrix may be used to select, per cycle, one instruction for each dispatch port. This age-ordering matrix may be implemented as a (N×M)×(N× M) age matrix. Or in an alternate embodiment, an N×N ROBID comparison may be used.

Figure 11:
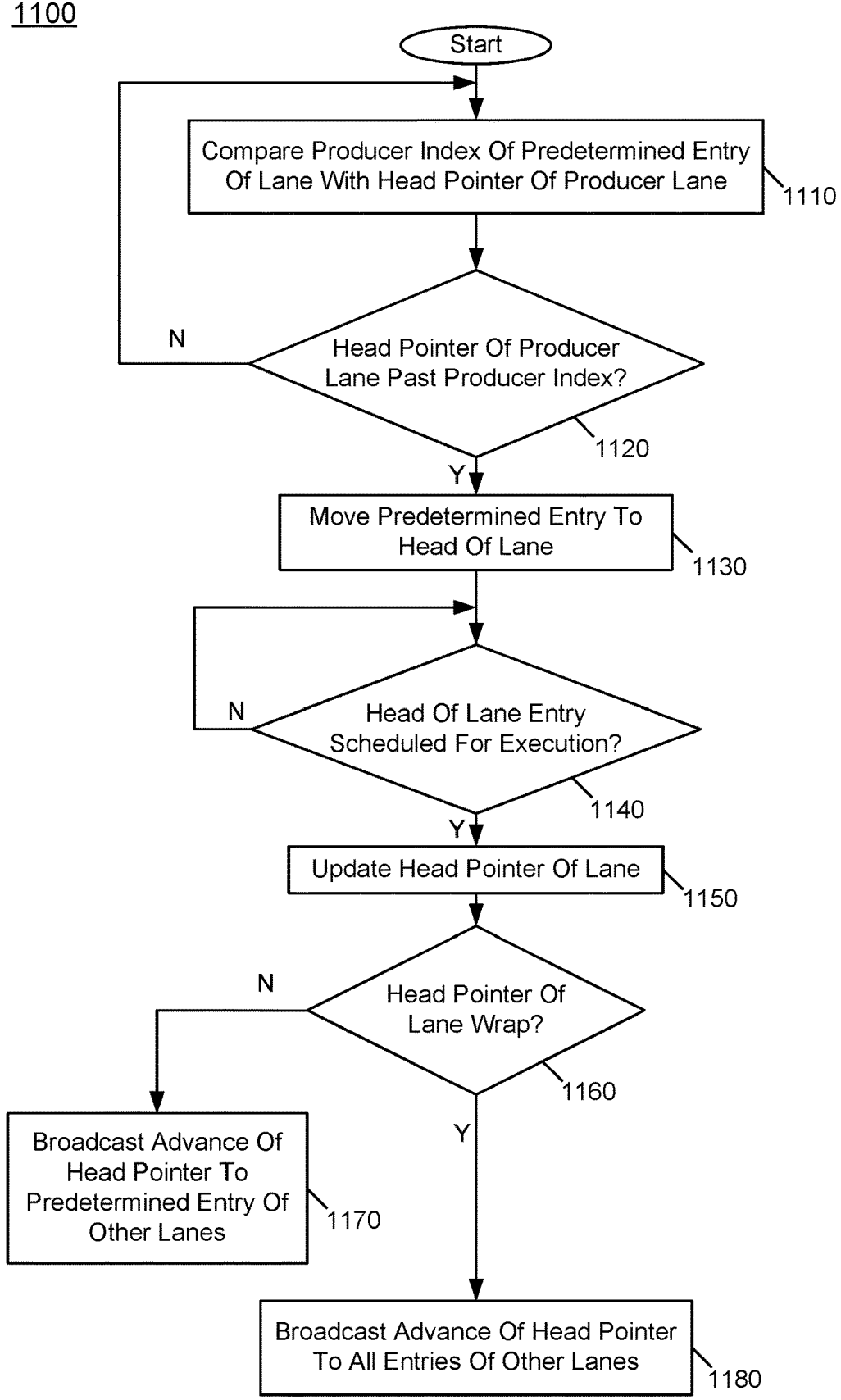
FIG. 11 is a flow diagram of a method in accordance with another embodiment of the present invention.

Referring now to FIG. 11, shown is a flow diagram of a method in accordance with another embodiment of the present invention. More specifically, method 1100 of FIG. 11 is a method for scheduling instructions for execution using a hybrid reservation station in accordance with an embodiment. As such, method 1100 may be performed by hardware circuitry, firmware, microcode and/or combinations thereof. In a particular embodiment, method 1100 may be performed by a control circuit of a reservation station, such as a scheduler circuit, which may execute firmware and/or microcode to perform the method.

As illustrated, method 1100 begins by comparing a producer index of a predetermined entry of a lane with a head pointer of the producer lane (block 1110). More specifically, this predetermined entry is a head of lane minus 1 (HOL−1) entry, namely the entry immediately after the head entry of the lane, which is the next instruction to be scheduled after the instruction in the head entry. And note that instructions in the head entry are ready for execution before being placed into the head entry.

Based on this comparison, it may be determined at diamond 1120 whether the head pointer of the producer lane is past the producer index of the predetermined entry (HOL−1 entry). If not, this instruction stored in the predetermined entry is not ready for execution. When it is determined that the head pointer of the producer lane is past the pointer index, this means that the producer instruction has been scheduled and as such, this instruction stored in the predetermined entry may be ready for scheduling. Accordingly, at block 1130 this entry may be moved to the head of the lane. Note that this operation may be effected by updating the head pointer. More specifically, movement from HOL−1 to HOL is effected by reading into the staging logic in the scheduling circuit. The head pointer is then updated when the instruction actually schedules, and if the next entry has all of its ready bits set, it is read into the staging logic.

Next it is determined whether this head of lane entry is scheduled for execution (diamond 1140). Such determination may be made when the scheduler circuit identifies this head of lane entry for scheduling to a given execution unit. If so, control passes to block 1150 where the head pointer of the lane may be updated to point to a next instruction. With this update, it may further be determined whether the head pointer of the lane wraps (diamond 1160). If not, control passes to block 1170 where the lane may broadcast an advance message of the head pointer to the predetermined entry of the other lanes, to allow such lanes to update a ready indicator as appropriate. If instead it is determined that the head pointer of the lane in fact wraps, control passes to block 1180, where the lane may broadcast an advance message of the head pointer to all entries of the other lanes. Understand while shown at this high level in the embodiment of FIG. 11, many variations and alternatives are possible.

Bypass information may be calculated from knowledge of producer location in the same lane and cross-lane, plus a head-of-lane stall counter, which tracks cycles since a producer scheduled. Sources dependent on an instruction in the VLTT may instead track the bypass information of the first dependent instruction in that lane, combined with stall information following that instruction. This tracking eliminates the need for dispatch-time bypass comparisons, which are high in power consumption.

Note that in an embodiment, each source of each lane entry may include a load dependency finite state machine (DepOnLoad FSM). When a load schedules from the VLTT, it wakes up the first consumer in each lane and initializes the DepOnLoad FSM at the same time. DepOnLoad information is forwarded to indirect dependents at wakeup time. When a load sends a cancellation signal to the reservation station, each dependent lane sets its head pointer back to the first consumer, and entries in such lanes reset their ready indication based on their DepOnLoad information. Sending DepOnLoad during wakeup instead of later during dispatch eliminates the need for a separate load matrix, reducing area, power, and complexity.

On a branch misprediction, any instructions younger than the branch may be cleared from the scheduler. Each lane clears some entries from its tail by comparing the ROBID of the branch to the entries. The VLTT also clears its first consumer IDs if those consumers were cleared, either using ROBID or lane entry ID information. The information in the RAT tracking the last writer's lane may be recovered in a similar manner to the register mapping.

The following examples pertain to further embodiments.

In one example, an apparatus includes: a plurality of first lanes each having a plurality of entries to store information for instructions having in-order dependencies; a variable latency tracking table including a second plurality of entries to store information for instructions having a variable latency; and a scheduler circuit to access a head entry of the plurality of first lanes to schedule, for execution on at least one execution unit, at least one instruction from the head entry of at least one of the plurality of first lanes.

In an example, each of the plurality of first lanes further comprises a content addressable memory to store a physical destination identifier of a destination operand of a tail instruction of the lane.

In an example, the apparatus further comprises an allocation circuit to allocate an incoming instruction into a lane of the plurality of first lanes having the physical destination identifier of the destination operand of the tail instruction corresponding to a physical source identifier of a source operand of the incoming instruction.

In an example, the allocation circuit is to select the lane based on comparison of the physical source identifier of the source operand of the incoming instruction to content addressable memories of a subset of the plurality of first lanes, the subset of the plurality of first lanes having entries that store producer instructions of source operands of the incoming instruction.

In an example, upon allocation, the allocation circuit is to store information for the incoming instruction comprising a second physical source identifier for a second source operand of the incoming instruction and a lane identifier for a lane of the plurality of first lanes that stores a producer instruction of the second source operand.

In an example, the allocation circuit is further to allocate the incoming instruction into the lane of the plurality of first lanes based on a count of cycles since another source operand of the incoming instruction was allocated into another lane of the plurality of first lanes.

In an example, each of the second plurality of entries comprises a plurality of lane fields to store an index of a first consumer instruction of the variable latency instruction stored in a corresponding lane of the plurality of first lanes.

In an example, the scheduler circuit is to set a ready indicator of a predetermined entry of a first lane of the plurality of first lanes based on comparison of a producer index of the predetermined entry to a head pointer of a lane of the plurality of first lanes having an entry that stores a producer instruction for an instruction stored in the predetermined entry.

In an example, the apparatus further comprises a sink lane to store information for instructions that do not have destination operands.

In an example, the scheduler circuit is to calculate bypass information for the at least one instruction based at least in part on a stall counter associated with a producer instruction for the at least one instruction.

In another example, a method comprises: receiving an instruction in a reservation station of a processor, the reservation station including a plurality of in-order lanes and at least one out-of-order lane; performing a content addressable memory search of tail entries of a subset of the plurality of in-order lanes to select a lane of the subset having a physical register destination identifier that matches a physical register source identifier of a source register of the instruction; and allocating an entry in the selected lane for the instruction and storing in the entry a lane identifier for another lane of the plurality of in-order lanes that stores a producer instruction for another source register of the instruction.

In an example, the method further comprises in response to determining that the selected lane is full, allocating an entry in a different lane for the instruction, and storing in the entry of the different lane a second lane identifier for the selected lane to identify a cross-lane dependency.

In an example, the method further comprises in response to determining that the selected lane is full and there are no available lanes of the plurality of in-order lanes, stalling allocation of instructions into the reservation station.

In an example, the method further comprises: receiving a second instruction in the reservation station, the second instruction comprising a variable latency instruction; and allocating an entry in a first out-of-order lane of the reservation station for the second instruction and storing in the entry a lane identifier for a lane of the plurality of in-order lanes that stores a producer instruction for a source register of the second instruction, the first out-of-order lane comprising a variable latency tracking table.

In an example, the method further comprises in response to determining that the instruction is dependent on the second instruction, writing an index of the entry of the instruction in the lane into a lane field of the entry of the first out-of-order lane.

In an example, the method further comprises: scheduling the second instruction for execution in a first execution unit; and in response to scheduling the second instruction, writing a ready indicator to the entry of the lane and initializing a dependent on load state machine of the entry.

In an example, the method further comprises: receiving a third instruction in the reservation station, the third instruction not having a destination; and allocating an entry in a second out-of-order lane of the reservation station for the third instruction, the second out-of-order lane comprising a sink lane.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises a processor and a dynamic random access memory coupled to the processor. The processor may include: a fetch circuit to fetch instructions; a decoder circuit to decode the instructions; a register alias table including a first plurality of entries each to store an association between a logical register and a physical register, and a buffer identifier and an index for a storage location in a reservation station for a producer instruction having a destination operand corresponding to the physical register; and the reservation station coupled to the register alias table. In turn, the reservation station includes: a plurality of in-order buffers each having a second plurality of entries to store information for instructions having in-order dependencies; at least one out-of-order buffer having a third plurality of entries to store information for instructions that may execute out of order with respect to the instructions having the in-order dependencies; an allocation circuit to allocate a first instruction into a first in-order buffer of the plurality of in-order buffers in response to a match between a physical source identifier of a source operand of the first instruction to a physical destination identifier of a destination operand of a tail instruction of the first in-order buffer; and a scheduler circuit to access a head entry of the plurality of in-order buffers to select the first instruction for execution, when the first instruction is stored in the head entry of the first in-order buffer. The processor may further include a first execution unit to execute the scheduled first instruction.

In an example, the allocation circuit is to select the first instruction for allocation into the first in-order buffer based on a comparison of the physical source identifier of the source operand of the first instruction to content addressable memories of a subset of the plurality of in-order buffers having entries that store producer instructions of source operands of the first instruction.

In an example, the allocation circuit is to use buffer identifiers obtained from the register alias table for source operands of the first instruction to identify buffers of the plurality of in-order buffers that store producer instructions of the source operands of the first instruction.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a plurality of first lanes, each of the plurality of first lanes having a plurality of entries to store information for instructions having in-order dependencies;
memory to store a variable latency tracking table including a second plurality of entries to store information for instructions having a variable latency;
a scheduler circuit to access a head entry of the plurality of first lanes to schedule, for execution on at least one execution unit, at least one instruction from the head entry of at least one of the plurality of first lanes; and
a sink lane to store information for instructions that do not have destination operands.

2. The apparatus of claim 1, wherein each of the plurality of first lanes further comprises a content addressable memory to store a physical destination identifier of a destination operand of a tail instruction of the lane.

3. The apparatus of claim 2, further comprising an allocation circuit to allocate an incoming instruction into a lane of the plurality of first lanes having the physical destination identifier of the destination operand of the tail instruction corresponding to a physical source identifier of a source operand of the incoming instruction.

4. The apparatus of claim 3, wherein the allocation circuit is to select the lane based on comparison of the physical source identifier of the source operand of the incoming instruction to content addressable memories of a subset of the plurality of first lanes, the subset of the plurality of first lanes having entries that store producer instructions of source operands of the incoming instruction.

5. The apparatus of claim 4, wherein, upon allocation, the allocation circuit is to store information for the incoming instruction comprising a second physical source identifier for a second source operand of the incoming instruction and a lane identifier for a lane of the plurality of first lanes that stores a producer instruction of the second source operand.

6. The apparatus of claim 3, wherein the allocation circuit is further to allocate the incoming instruction into the lane of the plurality of first lanes based on a count of cycles since another source operand of the incoming instruction was allocated into another lane of the plurality of first lanes.

7. The apparatus of claim 1, wherein each of the second plurality of entries comprises a plurality of lane fields to store an index of a first consumer instruction of the variable latency instruction stored in a corresponding lane of the plurality of first lanes.

8. The apparatus of claim 1, wherein the scheduler circuit is to set a ready indicator of a predetermined entry of a first lane of the plurality of first lanes based on comparison of a producer index of the predetermined entry to a head pointer of a lane of the plurality of first lanes having an entry that stores a producer instruction for an instruction stored in the predetermined entry.

9. The apparatus of claim 1, wherein the scheduler circuit is to calculate bypass information for the at least one instruction based at least in part on a stall counter associated with a producer instruction for the at least one instruction.

10. A non-transitory machine-readable medium having stored thereon instructions, which if performed by a machine cause the machine to perform a method comprising:
receiving an instruction in a reservation station of a processor, the reservation station including a plurality of in-order lanes and at least one out-of-order lane;
performing a content addressable memory search of tail entries of a subset of the plurality of in-order lanes to select a lane of the subset having a physical register destination identifier that matches a physical register source identifier of a source register of the instruction; and allocating an entry in the selected lane for the instruction and storing in the entry a lane identifier for another lane of the plurality of in-order lanes that stores a producer instruction for another source register of the instruction, and in response to determining that the selected lane is full and there are no available lanes of the plurality of in-order lanes, stalling allocation of instructions into the reservation station.

11. The non-transitory machine-readable medium of claim 10, wherein the method further comprises in response to determining that the selected lane is full, allocating an entry in a different lane for the instruction, and storing in the entry of the different lane a second lane identifier for the selected lane to identify a cross-lane dependency.

12. The non-transitory machine-readable medium of claim 10, wherein the method further comprises:
receiving a second instruction in the reservation station, the second instruction comprising a variable latency instruction; and
allocating an entry in a first out-of-order lane of the reservation station for the second instruction and storing in the entry a lane identifier for a lane of the plurality of in-order lanes that stores a producer instruction for a source register of the second instruction, the first out-of-order lane comprising a variable latency tracking table.

13. The non-transitory machine-readable medium of claim 12, wherein the method further comprises in response to determining that the instruction is dependent on the second instruction, writing an index of the entry of the instruction in the lane into a lane field of the entry of the first out-of-order lane.

14. The non-transitory machine-readable medium of claim 13, wherein the method further comprises:
scheduling the second instruction for execution in a first execution unit; and
in response to scheduling the second instruction, writing a ready indicator to the entry of the lane and initializing a dependent on load state machine of the entry.

15. The non-transitory machine-readable medium of claim 12, wherein the method further comprises:
receiving a third instruction in the reservation station, the third instruction not having a destination; and
allocating an entry in a second out-of-order lane of the reservation station for the third instruction, the second out-of-order lane comprising a sink lane.

16. A system comprising:
a processor comprising:
a fetch circuit to fetch instructions;
a decoder circuit to decode the instructions;
a register alias table including a first plurality of entries each to store an association between a logical register and a physical register, and a buffer identifier and an index for a storage location in a reservation station for a producer instruction having a destination operand corresponding to the physical register;
the reservation station coupled to the register alias table, the reservation station comprising:
a plurality of in-order buffers, each of the plurality of in-order buffers having a second plurality of entries to store information for instructions having in-order dependencies;
at least one out-of-order buffer having a third plurality of entries to store information for instructions that may execute out of order with respect to the instructions having the in-order dependencies;
an allocation circuit to allocate a first instruction into a first in-order buffer of the plurality of in-order buffers in response to a match between a physical source identifier of a source operand of the first instruction to a physical destination identifier of a destination operand of a tail instruction of the first in-order buffer, wherein the allocation circuit is to use buffer identifiers obtained from the register alias table for source operands of the first instruction to identify buffers of the plurality of in-order buffers that store producer instructions of the source operands of the first instruction; and
a scheduler circuit to access a head entry of the plurality of in-order buffers to select the first instruction for execution, when the first instruction is stored in the head entry of the first in-order buffer; and
a first execution unit to execute the scheduled first instruction; and
a dynamic random access memory coupled to the processor.

17. The system of claim 16, wherein the allocation circuit is to select the first instruction for allocation into the first in-order buffer based on a comparison of the physical source identifier of the source operand of the first instruction to content addressable memories of a subset of the plurality of in-order buffers having entries that store producer instructions of source operands of the first instruction.

* * * * *